United States Patent
Smith Carter

(10) Patent No.: US 7,041,891 B2
(45) Date of Patent: May 9, 2006

(54) CHORAL KEYBOARDING NON-NOTE READING METHODOLOGY

(76) Inventor: Lena Faye Smith Carter, 205 congdon St., E., Middletown, CT (US) 06457

( * ) Notice: Subject to any disclaimer, the term of this patent is extended or adjusted under 35 U.S.C. 154(b) by 16 days.

(21) Appl. No.: 10/809,743

(22) Filed: Mar. 25, 2004

(65) Prior Publication Data

US 2005/0014110 A1    Jan. 20, 2005

Related U.S. Application Data

(60) Provisional application No. 60/458,726, filed on Mar. 28, 2003.

(51) Int. Cl.
*G09B 15/00*    (2006.01)

(52) U.S. Cl. ...................... 84/478; 84/470 R

(58) Field of Classification Search ............... 434/156, 434/178, 188, 433, 227, 230; 84/470 R, 84/477 R, 478, 479 A, 483.1, 483.2
See application file for complete search history.

(56) References Cited

U.S. PATENT DOCUMENTS

| | | | | | |
|---|---|---|---|---|---|
| 608,771 | A | * | 8/1898 | Guilford | 84/471 R |
| 1,201,769 | A | * | 10/1916 | Siegel | 84/423 R |
| 1,526,547 | A | * | 2/1925 | Hughey | 84/471 R |
| 2,807,183 | A | * | 9/1957 | Ney | 84/471 R |
| 4,752,230 | A | * | 6/1988 | Shimizu | 434/317 |
| 5,496,179 | A | * | 3/1996 | Hoffman | 434/433 |
| 5,574,242 | A | * | 11/1996 | Bui | 84/483.1 |
| 6,388,182 | B1 | * | 5/2002 | Bermudez | 84/477 R |

\* cited by examiner

*Primary Examiner*—Kurt Fernstrom

(57) ABSTRACT

A non-note reading methodology developed for the instant ability of lay people/students to use any keyboard instrument to play notes combined with cardinal numbers (1–8). They can instantly play melodies/choral parts. The notes of the scale are numbered from 1–8 according to their sequential position in the diatonic scale. Accidentals are identified by their usual symbols (#,b) and explained as closest note to right and closest note to the left, respectively. Naturals would appear in their naturally occurring 1–8 position. Notes in melodies that extend into another octave, higher or lower, are indicated by + or –, respectively, continuing the 1–8 or 8–1 sequence, depending on direction. Keyboards are all built on the diatonic scale principle of whole step, whole step, half step, whole step, whole step, whole step, half step; all playing takes place in the key of C. This does not preclude the ability to play in the key written if electronic instruments are used with a transposition key.

1 Claim, 11 Drawing Sheets

Middle C  13

FIG. 6

| | | | | |
|---|---|---|---|---|
| C | c d e f g a b c<br>1 2 3 4 5 6 7 8 | | G | g a b c d e f# g<br>1 2 3 4 5 6 7 8 |
| C# | c# d# e# f# g# a# b# c#<br>1 2 3 4 5 6 7 8 | | Gb | gb ab bb cb db eb f gb<br>1 2 3 4 5 6 7 8 |
| Cb | cb db eb fb gb ab bb cb<br>1 2 3 4 5 6 7 8 | | A | a b c# d e f# g# a<br>1 2 3 4 5 6 7 8 |
| D | d e f# g a b c# d<br>1 2 3 4 5 6 7 8 | | Ab | ab bb c db eb f g ab<br>1 2 3 4 5 6 7 8 |
| Db | db eb f gb ab bb c db<br>1 2 3 4 5 6 7 8 | | B | b c# d# e f# g# a# b<br>1 2 3 4 5 6 7 8 |
| E | e f# g# a b c# d# e<br>1 2 3 4 5 6 7 8 | | Bb | bb c d eb f g a bb<br>1 2 3 4 5 6 7 8 |
| Eb | eb f g ab bb c d eb<br>1 2 3 4 5 6 7 8 | | | |
| F | f g a bb c d e f<br>1 2 3 4 5 6 7 8 | | | |
| F# | f# g# a# b c# d# e# f#<br>1 2 3 4 5 6 7 8 | | | |

FIG. 8

The Star-Spangled Banner

Soprano

5 3 1   3  5   8 +3 +2 8    3 4# 5
Oh say can you see by the dawn's early light 5    5 +3+2  8   7     6  7   8 8    5    3 1
What so proudly we hailed at the twilight's last gleaming.

5     3    1    3  5    8      +3    +2  8  3 4#  5
Whose broad stripes and bright stars, through the perilous fight, 5    5   +3  +2 8    7      6   7 8 8 5    3 1
O'er the ramparts we watched were so gallantly streaming.

+3 +3  +3+4   +5  +5     +4  +3     +2 +3 +4+4
And the rocket's red glare, the bomb's bursting in air +4    +3    +2    8    7    6   7   8    3    4# 5
Gave proof through the night, that our flag was still there.

5   8    8   8 7   6    6    6  +2+4+3 +2 8   8 7
Oh, say does that star-spangled banner   yet   wave, 5   5  8+2 +3 +4   +5   8   +2  +3   +4 +2   8
O'er the land  of the free and the home of the brave.

FIG. 8 CONTINUED

The Star-Spangled Banner

Alto

5 3 1   3   5   3   3 3   3     3 2 2
Oh say can you see by the dawn's early light 5    5 5   5 5 5    5 5   5 8   5   3 1
What so proudly we hailed at the twilight's last gleaming.

5    3   1   3 5   3   3    3   3 3 2  2
Whose broad stripes and bright stars, through the perilous fight, 5   5 5   5   5 5    5   5 5 8 5   3 1
O'er the ramparts we watched were so gallantly streaming.

8   8   8+2   +3 +3   +2 8    7   8 +2+2
And the rocket's red glare, the bomb's bursting in air 5   5   5   5 5   5   5 5   3   2   2
Gave proof through the night, that our flag was still there.

5   3 4   5   4   4 5   4 45 6   5
Oh, say does that star-spangled banner yet wave, 5   5   5   5 8   8   6   4# 5    6 4   3
O'er the land of the free and the home of the brave.

FIG. 8 CONTINUED

The Star-Spangled Banner

Tenor

5 3 1    8 +2    8 7 7 8    8 8 7
Oh say can you see by the dawn's early light 5    5 8    7 8 +2    +2 +2 8 8    5    3    1
What so proudly we hailed at the twilight's last gleaming.

5    3    1    8 +2    8    7    7    8 8 8    7
Whose broad stripes and bright stars, through the perilous fight, 5    5 8    7    8 +2    +2 +2 8 8    5    3    1
O'er the ramparts we watched were so gallantly streaming.

+3 +3  +3+4    +5    +5    +4 +3    +2 +3    +4+4
And the rocket's red glare, the bomb's bursting in air 7    8    7    8    +2    +2 +2 8    8    8    7
Gave proof through the night, that our flag was still there.

5    8    8    8    8    8    8# +2    6 +4+3    +3+2
Oh, say does that star-spangled banner yet    wave, 7    7    8+2+3+4  +5 +3    8  8    8  7  8
O'er the land of the free and the home of the brave.

FIG. 8 CONTINUED

The Star-Spangled Banner

Bass

5 3 1    8    7    6  5# 5#  6      6  2  5
Oh say can you see by the dawn's early light 5     5  1    2  3  5     4    4  3  8     5    3    1
What so proudly we hailed at the twilight's last gleaming.

5       3     1     8  7      6      5#       5# 6 6 2  5
Whose broad stripes and bright stars, through the perilous fight, 5    5  1  2    3    5       4      4  3 8 5   3    1
O'er the ramparts we watched were so gallantly streaming.

22         1-------------------                  5---------------
\\           AH------------             AH--------------
*(And the rocket's red glare, the bomb's bursting in air)

5     1     2      3     5  4    4   3   6   2     5
Gave proof through the night, that our flag was still there.

5   1 2    3   4     4 3    2 2 3   44#   5
Oh, say does that star-spangled banner yet wave, 5    4    35  8 +2 +3   6    6    5      5 5  1
O'er the land of the free and the home of the brave.

US 7,041,891 B2

CHORAL KEYBOARDING NON-NOTE READING METHODOLOGY

CROSS-REFERENCE TO RELATED APPLICATIONS

This application claims the benefit of Provisional Patent Application Ser. No.60/458,726 Filed 2003 Mar. 28.

This process/methodology relates to rapid reading/reproduction of choral parts/melodies without the ability to read notes.

BACKGROUND OF THE INVENTION

By the simple ability to count, both forward and backward, students/non-musicians can reproduce vocal parts. This is a process/methodology of rapid non-note reading keyboard reproduction of choral parts/singular melodies. It is designed to allow users to instantaneously reproduce melodic and harmonic choral parts and other singular melodies. This process is useful for the independent learning of these melodic/harmonic parts. It reduces the necessity of constant rote re-teaching. Learning choral parts or singular melodies requires a degree of musical skill not usually found in school children or lay musicians. This usually leaves the choral instructor overwhelmed with the responsibility of continuously re-teaching parts, section-by-section.

Many sight-reading methodologies have been employed in an attempt to quickly prepare programs for public performance. They have not worked to great advantage because of the following: (1) the inconsistency of programs employed, (2)differing methodologies employed by changing personnel, and (3)high transient student populations. In fact, they work against the necessary instantaneity due to the fact that they are time-consuming in their need for constant alignment and uniformity. Also most methodologies require skills sufficient to avoid multiple instructor-led repetitions. These skills are not generally sufficiently developed in substantial portions of the student/lay population. This choral keyboarding process/methodology will provide a long sought after independence in non-note reading musical learning not heretofore seen.

U.S. Pat. No. 6,388,182 to Bermudez (2002) shows a music teaching method where a notation sheet (specially designed) is used to depict a song to be played by having numbers on the sheet correspond to the fingers of the hand (1–5) from thumb to pinkie). These match ten consecutive keys on the piano with other symbols to indicate both hands and the keyboard, whereby when the numbers appear, the fingers are depressed correspondingly. There is also an additional layer of fingering for additional range. It should be noted that because of the large number of notes that can be found in a melody, it is easier to define the octave range in a limited manner. Students/lay musicians will be able to simplify their reproduction of the same.

U.S. Pat. No. 6,380,470 to Fujiwara, et. al., (2002) is another training system for music performance, i.e., a keyboard musical instrument equipped with a training keyboard. This keyboard has "keys equal to a multiple of five assigned to the fingers of a trainee." There is also an electronic sound generating system. While this system has multiple assignations of keys to fingers which it considers suitable for "stepwise improving of skills," specialized equipment is still needed, allowing the student/lay musician without this equipment, to be robbed of the ability to function instantaneously and accurately on available equipment, utilizing standard readiness information.

In U.S. Pat. No. 6,407,324 to Hulcher (2002) and U.S. Pat. No 3,379,087 to Weitzner (1968) devices are employed in an effort to familiarize the receiving audience with some musical conventions. Hulcher describes his patent as a piano instructional apparatus with LED's to identify what should be played and by which hand. Also the electronic ability to "encrypt a plurality of songs in the memory" denies any student/lay musician the musical experiences inherent in their intellectual participation in the manual repetition and individual involvement in the same. Weitzner (1968) describes an electrically operated display and cueing device utilized with lamps and coded marks, the same cueing display housed in "a separate cabinet adapted to be placed upon a piano, or other instrument." Display windows, relays, coils, lighted lamps, colored lighted lamps, etc., would all need to be included. Again amateur musicians with little knowledge and no musical readiness and lack of this equipment would be unable to effectively participate in a total musical activity/experience. These devices, if available, could assist the non-musician, but, if relegated to the standard equipment, without benefit of lights, coils, relays, etc., musical experiences would be limited.

Bubar (1997), U.S. Pat. No. 5,685,7245 provides a system of teaching music which utilizes charts showing hand placement on the keyboard with instructions as to how the sheet music corresponds to the chart indicia. This method begins with chord playing accompanied by charts. This represents a logical order of musical complexity. Additional information related to "every other finger plays every other key" is assisted by charts. The charts are simple and easy to read, but without them the musical experiences are stymied and limited particularly without the establishment of visual/tactile stimuli unrelated to the charts.

John C. Bostelmann (1940), U.S. Pat. No. 2,188,098 is an additional patent with a chart for piano playing but again students/lay musicians who depend on charts, lights, or other external devices will fail to develop the necessary visual/tactile "readiness" connections for the octave manipulations necessary to melodic reproductions.

A piano chart in U.S. Pat. No. 201,030, F. E. Mason (1878) and a similar device cited in U.S. Pat. No. 4,905,567 Kavorklis (1990) is shown, but again with the actual device, visual/tactile "readiness" connections are not made. These devices are strictly related to location of notes and do not clarify the advancements reachable through the various manipulations of the notes.

In conclusion, this choral keyboarding methodology developed for participants who cannot read music provides a director with the degree of independence and instantaneity in learning by his/her participants.

BACKGROUND OF INVENTION—OBJECTS AND ADVANTAGES

Accordingly, besides the possibility of using this methodology on any available equipment and the ease with which it can be learned, several additional advantages of this methodology are:

(a) to allow students/lay musicians to work independently with their choral parts;
  (b) to provide meaningful musical experiences for non-musicians;
  (c) to allow non-readers the ability to achieve independent learning of parts;
  (d) to provide a methodology which works quickly for the performance-based curriculum;

(e) to allow students individuality in sectional reproduction; and (f) to allow leadership among students whose readiness level allows them to reproduce parts for sectionals

SUMMARY

This process/methodology called choral keyboarding has a limited scope of numbers (1,2 3,4,5,6,7,8, with +, −, # and b signs) as related to the major scale and octave positioning related to range). This is directly applicable to any musical composition in any key and transferable to any keyboard in a user friendly and accessible manner. Still further advantages and applicability will become apparent from a study of the following description and the accompanying drawings.

DRAWING—FIGURES

FIG. 1 is an enlarged aerial view of a standard keyboard octave beginning with middle c and ending with the octave.

FIG. 2 is a view of a standard keyboard utilizing the 3-octave range with the standard note names, shown in what is the prescribed 3-octave range with the negative (−) regular, positive (+), i.e., left-center-right octave relationship necessary to reproduce melodic and harmonic choral parts and singular melodies in the soprano and alto range, c, c1 and c2. Actual notation is shown above the keyboard.

FIG. 6 is a chart of all major scales and their numbered degrees necessary for converting any music in any key into a format for choral keyboarding. Minor keys, both parallel and relative, can be used in the same manner of numbering (numerical indicia) adhering to the accidentals explanation. The accidentals explanation is as follows: The sharp (#) is understood to be located on the keyboard as the closest note to the right of the number (no matter the color); the flat (b) is understood to be located on the keyboard as the closest note to the left of the number (no matter the color). No naturals need to be placed as the appearance of the number is automatically on the original note.

Figure 7:
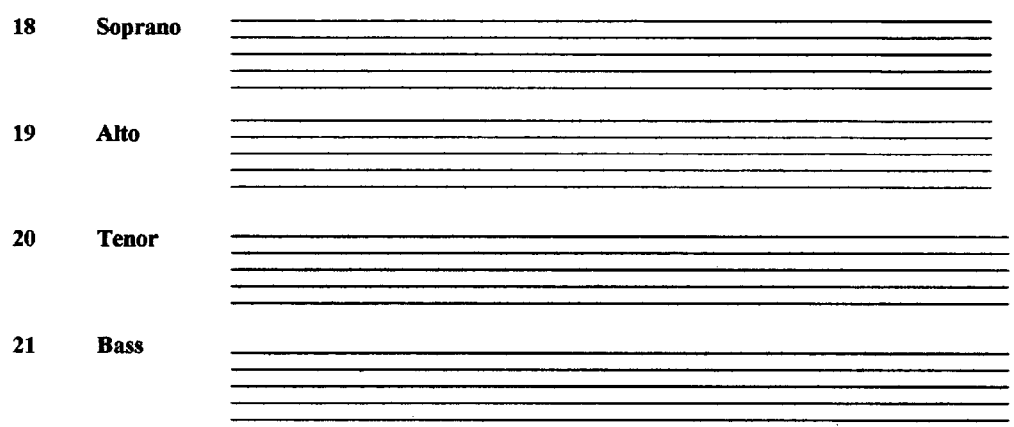

FIG. 7 is the first of two possible presentations, a fragmentary view of an octavo, the form in which choral music is published, whereon the 3-octave choral keyboarding system of numbers would be placed.

FIG. 8 is a second presentation of part specific material specified as text plus numbers for the 3-octave manipulation of choral keyboarding.

DRAWINGS—REFERENCE NUMERALS

| | |
|---|---|
| 11 | 2 black key segment |
| 12 | 3 black key segment |
| 13 | 2 white key segment |
| 14 | keyboard ranges for c, c1 and c2 |
| 15 | keyboard ranges for C, c, and c1 |
| 16 | negative/regular/positive numbers for c, c1, and c2 |
| 17 | negative/regular/positive numbers for C, c, and c1 |
| 18 | soprano line |
| 19 | alto line |
| 20 | tenor line |
| 21 | bass line |
| 22 | parenthesized text appearance |

DETAILED DESCRIPTION—FIGS. 1–8

Figure 1:
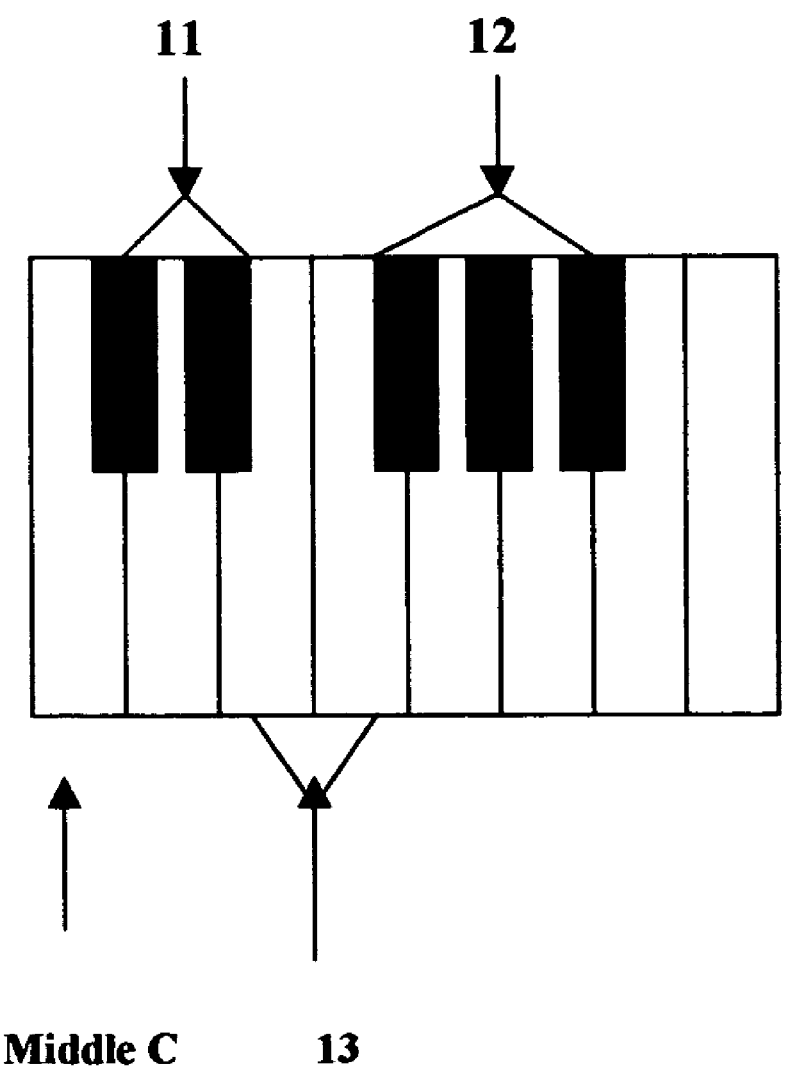
Figure 2:
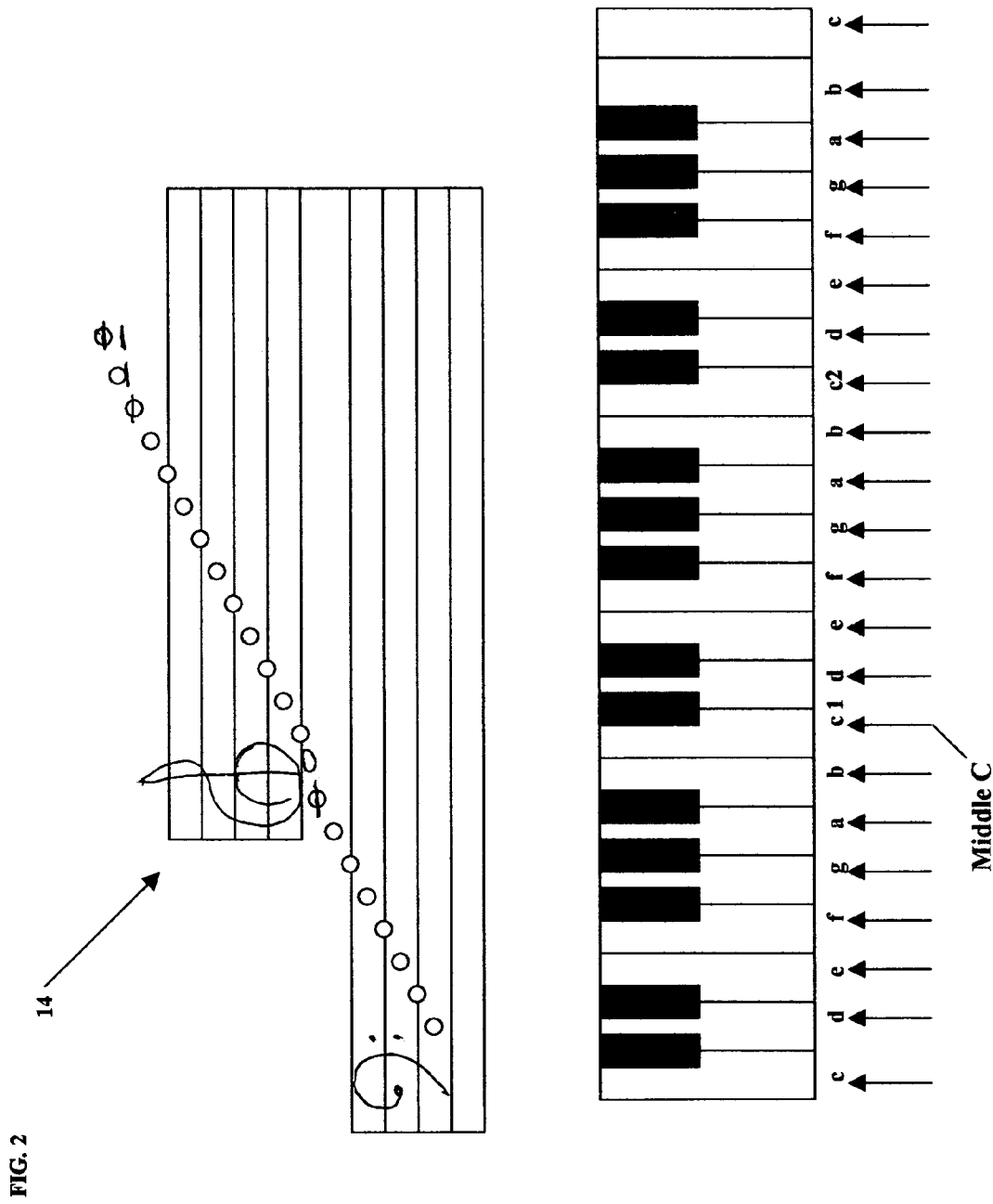
Figure 3:
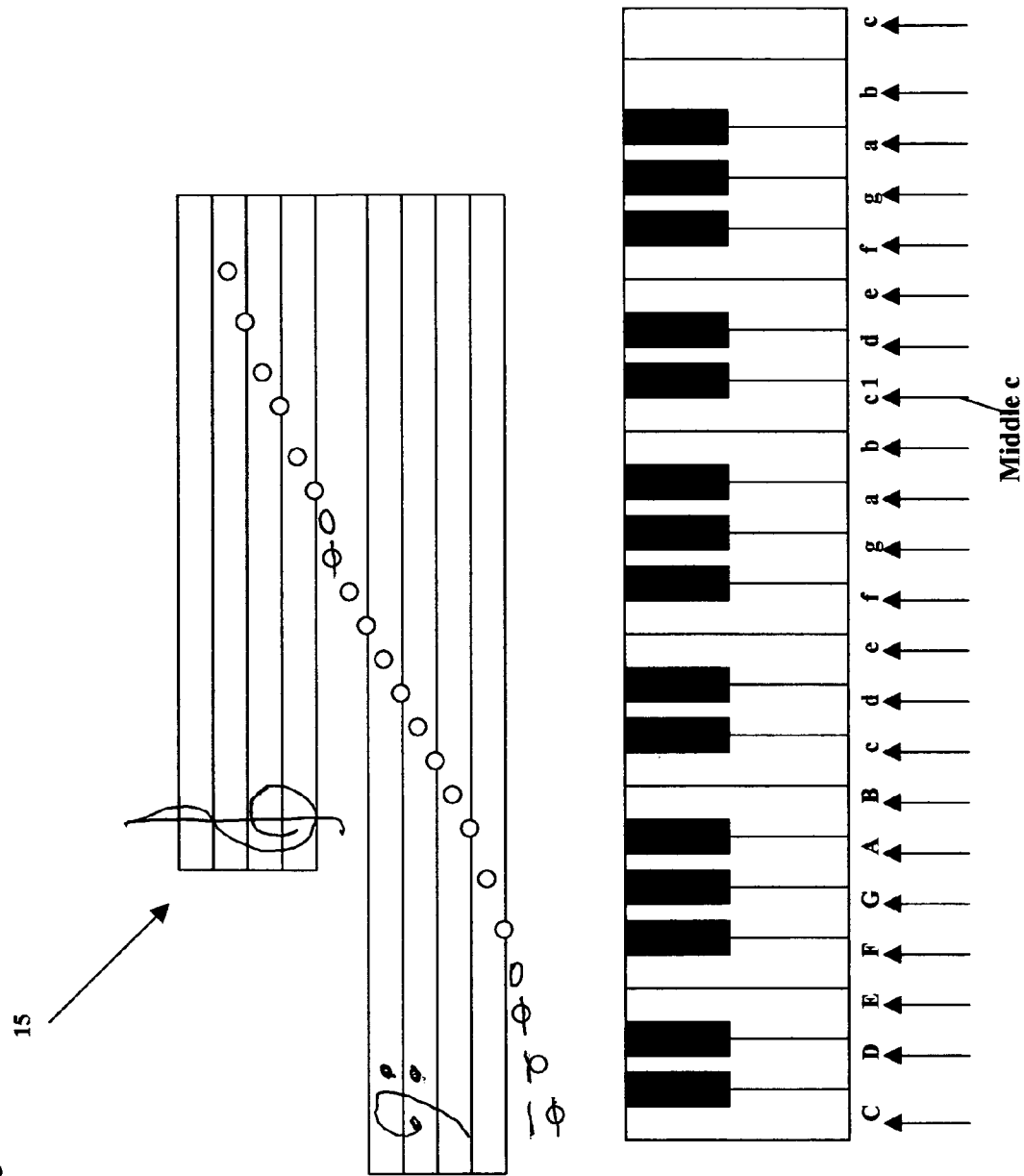
FIG. 3 is a view of a standard keyboard utilizing the 3-octave range with the standard note names, shown in what is the prescribed 3-octave range with the negative (−), regular, positive (+), i.e., left-center-right octave relationship necessary to reproduce melodic and harmonic choral parts and singular melodies in the tenor and range—C, c, and c1. Actual notation is shown above the keyboard.

A preferred presentation of the standard keyboard shown in FIG. 1 is showing the standard keyboard as it occurs on even-tempered instruments. The two black key configuration 11 of the keyboard is pointed out for students unfamiliar with a keyboard. The three black key configuration 12 is also pointed out and shown in their recurrent presentations in subsequent octaves. Although the two white key presentation is in the normal 1,2,3,4,5,6,7,8, presentation, 13 points out its significance with respect the ultimate occurrence of sharps and flats. The explanation further follows with the keyboard consisting of groups of two and three black keys. The white key immediately left of any two black keys should be counted as 1. Once 1 is chosen, after explaining about the occurrence of middle c, and octave immediately left must be chosen as the negative octave (−) and an octave immediately right of the middle c octave must be chosen as the positive octave (+). How these ranges should be assigned according to major voice types, soprano, alto, tenor and bass, is further described in FIGS. 2, 3, 4, and 5.

FIGS. 2 and 4 14 and 16, show the notes available in the octaves of the soprano and alto range. The keyboards below the notational range show the three octaves in a negative-regular-positive relationship as they will be used pursuant to this methodology. You will note that sopranos and altos are encouraged to use c(small),c1(c prime),and c2.

FIGS. 3 and 5 15 and 17, show the notes available in the octaves of the tenor and bass range. Tenors would be given C (great), c small and c prime for their three octave position as the majority of their melodies are limited in range, as follows: C great as their negative octave, c small as their regular octave and c prime as their positive octave. Basses would also be given C, c, and c1. With these designations, the tenors and basses would be able to play most melodies. Of course, the melodies would be out of range in some situations, however, with current technology, it would be relatively easy to use the transposition key to allow the parts to sound in the appropriate range and key. Practice below the intended key gives non-musicians a degree of security and comfort as not everyone feels like singing super high/low notes early in the morning or late at night.

FIG. 6 shows that all major scales have the numbers 1–8 corresponding to their note names from the beginning of the scale to the end of the scale and should be thought of in three octaves. With this in mind, you will consider three-octave scales with no repetition of notes and thus 8 becomes 1 in the sequence of 12345678234567823456782345678 or, vice versa, 8765432176543217654321. Depending on the occurrence of the note in the melodic sequence, you may choose to call it 8 or 1.

FIG. 7 18 19 20 21 shows he appearance of staves as they would occur on a vocal octavo and the lines that the voices would follow.

FIG. 8 shows sheets prepared for non-musicians utilizing the standard voices of a four-part choir with numerals attached in the negative/regular/positive octave relationships.

On the bass part of FIG. 8 parenthesized text appears. The explanation to be given is parenthesized text is used as a point of reference for the entrance of an auxiliary (vowel sound) syllable. For example, if the entering harmony may be asked to sustain a sound over a certain amount of the parenthesized text. The - - - line indicates the length of the held note in reference to the text. Simply, - - - stops, vowel sound stops. Entry of the sustained vowel sound is indicated by the appearance of the number over the textual syllable.

FIGS. 2–5 Additional Embodiments

From the given tone(1) all other notes follow in the pattern consecutively: 1 2 3 4 5 6 7 8

| (middle) | c d e f g a b c |
|---|---|
| | 1 2 3 4 5 6 7 8 |

After having gone through 12 or 14 songs, as in FIG. 8, the difficulty level can be increased by having non-musicians play two or three parts, play their own parts rhythmically correct with electronic assistance, and play their parts alone and with others.

While it is necessary to have the information regarding the negative/regular/positive octave relationship, traditional staffs, clefs, notes, et. al., are bypassed in an attempt to have your students play instantaneously. The other symbols will of course be mentioned in the in the natural course of events.

Operation—FIGS. 2, 3, 4,5, 8

In the operation of the choral keyboarding process/methodology it is assumed that the practitioners have a limited repertoire of songs. Also that they are able to count consecutively, both backwards and forwards from 1 through 8, realizing the interchangeability of 1 and 8, due to the occurrence of the seven original keys before the beginning of another octave sequence of the same notes, ascending and descending. Spatial readiness will allow them to discriminate left to right. Necessary to the use of the methodology is a five-octave keyboard with A440 in the third octave or regular piano.

A thorough understanding of the sharp (#) to be located on the keyboard as the closest note to the right of the number (no matter the color). Also a thorough understanding of the flat (b) to be located on the keyboard as the closest note to the left of the number (no matter the color).

Figure 4:
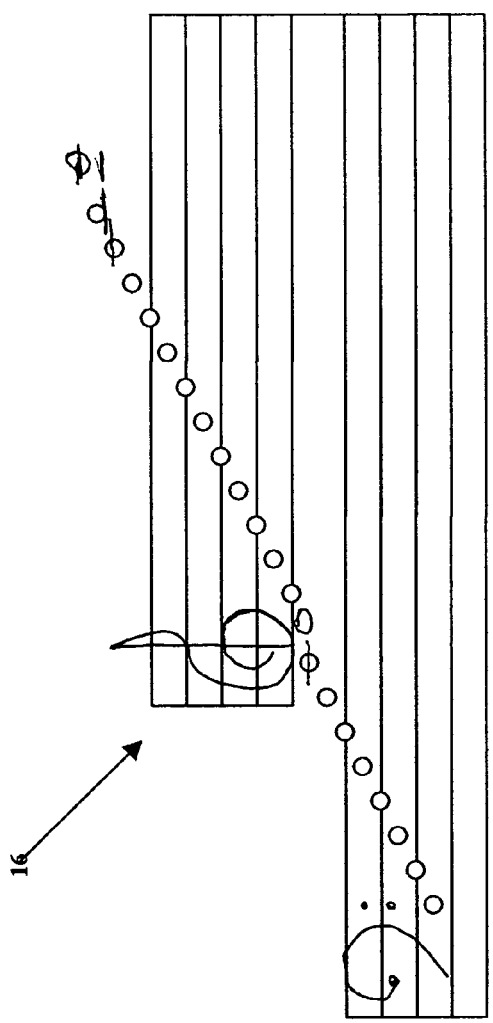
FIG. 4 is a view of a standard keyboard utilizing the 3-octave range with numbers, shown in what is the prescribed 3-octave range with the negative (−), regular, positive (+), i.e., left-center-right octave relationship necessary to reproduce melodic and harmonic choral parts and singular melodies in the soprano and alto range—c, c1 and c2. Actual notation is shown above the keyboard.
Figure 4:
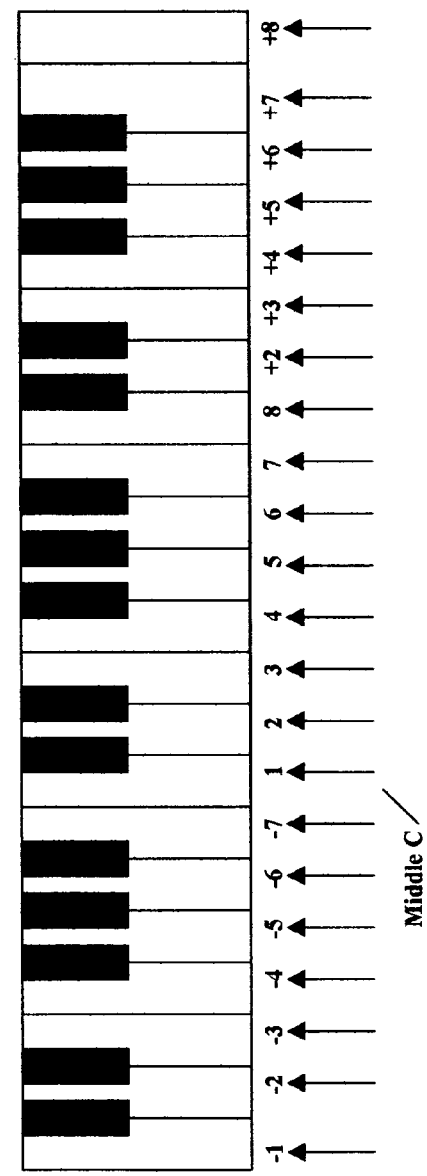
Figure 5:
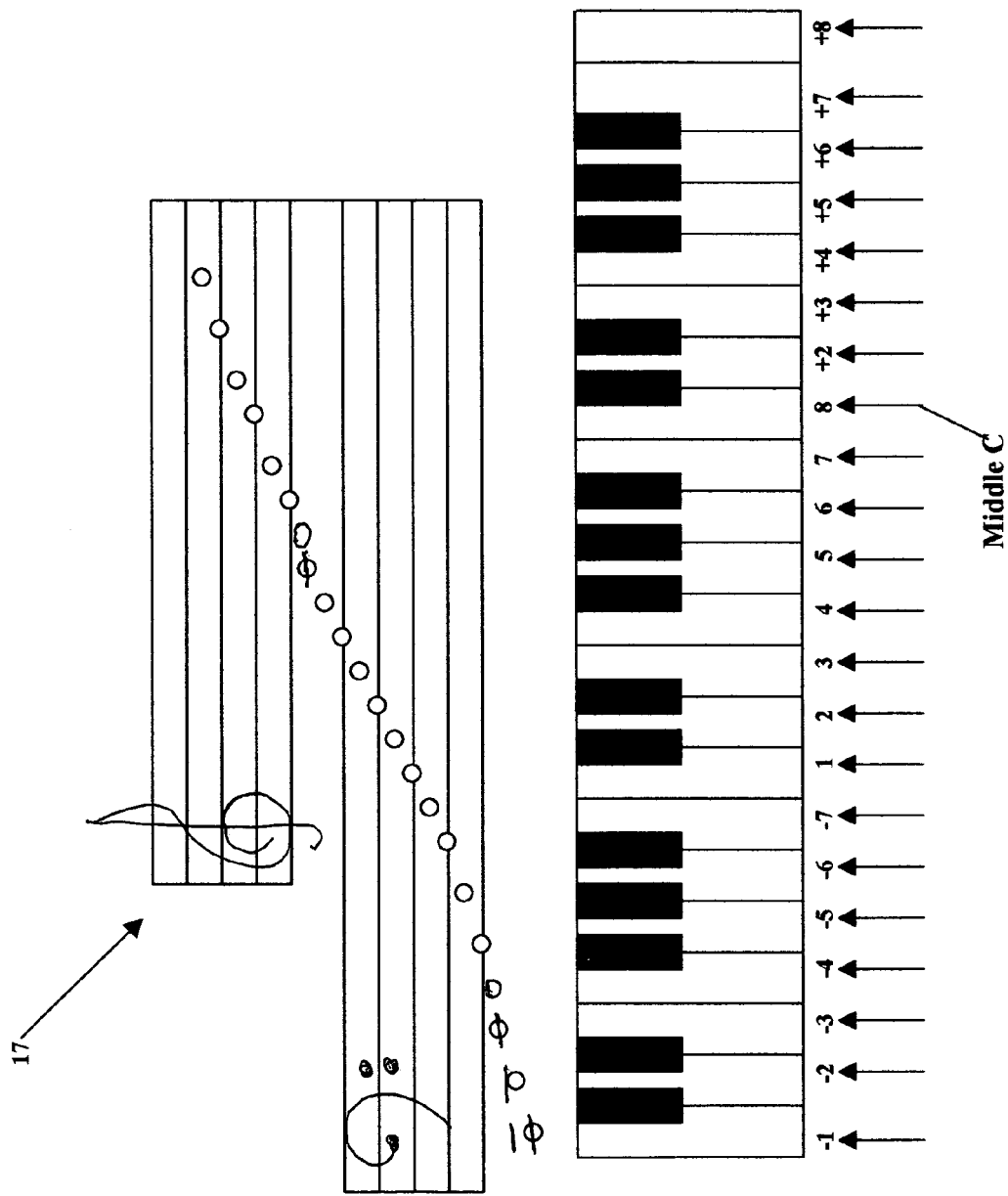
FIG. 5 is a view of a standard keyboard utilizing the 3-octave range with the numbers, shown in what is the prescribed 3-octave range with the negative (−), regular, positive (+), i.e., left-center-right octave relationship necessary to reproduce melodic and harmonic choral parts and singular melodies in the tenor and bass range—C, c, and c1. Actual notation is shown above the keyboard.

The presentation of FIGS. 4 and 5 will support an understanding of + and − as related to this process/methodology. They are to perceive the range for reproduction as three octaves, octave 1 (left) be considered the minus (−) numbers, octave 2 (center) be considered the regular (no signs) octave, and that octave 3 (right) be considered the plus (+) octave.

The three-octave scales with no repetition of the notes is as follows:

| −1 −2 −3 −4 −5 −6 −7 1 2 3 4 5 6 7 8 +2 +3 +4 +5 +6 +7 +8 |
|---|
| (−8) (+1) |

And further, that depending on the occurrence of notes in the melodic sequences (−8) and (+1) are shown for a thorough understanding of all numbers in the sequence, but they are seldom used in the sequence of melodic/harmonic patterns.

Advantages

From the foregoing description, this process/methodology is designed to provide rapid non-note reading keyboard reproduction of choral parts or singular melodies. A user of the methodology can individually learn choral parts (harmonic and melodic) or other singular melodies, to thereby attain independence in learning choral parts/melodies. The user can have as many repetitions as required for his/her particular aptitude, thereby solving the problem of individual learning paces. Thus a considerably more versatile student/lay person has the capability of reproducing choral parts or singular melodies, thereby actively participating in the necessarily repetitive(rote) learning process needed when limited music reading skills are present.

Conclusion, Ramifications, and Scope

The ease and simplicity with which this process/methodology can be used remains one of its most prominent features. A brief introduction to the negative/regular/positive octave relationships is true to our societal left/right orientation. Coupled with the use of numbers, rather than the complexity of notation makes this methodology user-friendly. The user is:

(a) not limited in his/her required number of repetitions;
(g) able to function free of continuous instruction;
(h) able to make fingering decisions that are comfortable;
(i) able to use numbers which are familiar throughout the educational experience;
(j) able to work at his/her individual pace;
(k) able to establish independence in part-singing; and
(l) this process methodology can be used with any type of music in print.

What is claimed is:

1. What is claimed is a method of providing musical notation to a score, comprising the steps of:

(a) assigning an identifying indicia to each note across a three octave range comprising a left octave, a middle octave, and a right octave, wherein indicia ranging from "−1" to "−7" are assigned to notes C through B of the left octave respectively, indicia ranging from "1" through "8" are assigned to the note C of the middle octave through and the note C of the higher octave respectively, and indicia ranging from "+2" to "+7" are assigned to the notes D through B of the right octave respectively; and (b) providing one or more printed music sheets selected from textual and hymnal format, where a musical score is printed on each music sheet and said identifying indicia corresponding to each note of the score is printed with the respective note; where the ability to identify each note in a score is aided.

* * * * *